United States Patent
Lee et al.

(10) Patent No.: US 9,296,063 B2
(45) Date of Patent: Mar. 29, 2016

(54) SPOT WELDING APPARATUS

(71) Applicant: Hyundai Motor Company, Seoul (KR)

(72) Inventors: So Young Lee, Euiwang-si (KR); Sung Phil Ryu, Seoul (KR)

(73) Assignee: Hyundai Motor Company, Seoul (KR)

( * ) Notice: Subject to any disclaimer, the term of this patent is extended or adjusted under 35 U.S.C. 154(b) by 89 days.

(21) Appl. No.: 14/106,311

(22) Filed: Dec. 13, 2013

(65) Prior Publication Data

US 2015/0090699 A1 Apr. 2, 2015

(30) Foreign Application Priority Data

Sep. 30, 2013 (KR) .......................... 10-2013-0116501

(51) Int. Cl.
| | |
|---|---|
| *B23K 9/32* | (2006.01) |
| *B23K 11/31* | (2006.01) |
| *B23K 11/11* | (2006.01) |

(52) U.S. Cl.
CPC ............ *B23K 11/314* (2013.01); *B23K 11/115* (2013.01); *B23K 11/311* (2013.01); *B23K 11/315* (2013.01); *B23K 2201/006* (2013.01)

(58) Field of Classification Search
USPC ............... 219/86.25, 87, 117, 91.2, 80, 86.33
See application file for complete search history.

(56) References Cited

U.S. PATENT DOCUMENTS

| | | | | |
|---|---|---|---|---|
| 1,635,583 | A * | 7/1927 | Mradowcroft | ............... 219/86.8 |
| 6,373,020 | B1 * | 4/2002 | Fujita et al. | ..................... 219/87 |
| 6,512,194 | B1 * | 1/2003 | Koshurba et al. | .......... 219/86.25 |
| 7,952,046 | B2 * | 5/2011 | Beneteau et al. | .......... 219/86.33 |
| 8,304,681 | B2 * | 11/2012 | Kilibarda | ................... 219/86.25 |
| 2003/0094441 | A1 * | 5/2003 | Dugas et al. | .................... 219/90 |
| 2004/0050827 | A1 * | 3/2004 | Aktas | ......................... 219/117.1 |
| 2004/0065641 | A1 * | 4/2004 | Gabbianelli et al. | .......... 219/108 |
| 2004/0134888 | A1 * | 7/2004 | Garza et al. | ..................... 219/87 |
| 2004/0173578 | A1 * | 9/2004 | Leach et al. | ................... 219/110 |
| 2007/0187370 | A1 * | 8/2007 | Hochhalter et al. | ....... 219/86.32 |
| 2010/0243615 | A1 * | 9/2010 | Angel | ......................... 219/117.1 |
| 2011/0017710 | A1 * | 1/2011 | Yasunaga et al. | .............. 219/87 |

FOREIGN PATENT DOCUMENTS

| | | | | |
|---|---|---|---|---|
| JP | 9-216068 | A | 8/1997 | |
| JP | 09206956 | A * | 8/1997 | ............. B23K 11/24 |
| JP | 3328891 | B2 | 7/2002 | |
| KR | 1999-0065940 | A | 8/1999 | |
| KR | 10-2012-0051557 | A | 5/2012 | |
| KR | 10-2012-0074000 | A | 7/2012 | |

* cited by examiner

*Primary Examiner* — David Angwin
*Assistant Examiner* — Ayub Maye
(74) *Attorney, Agent, or Firm* — Morgan, Lewis & Bockius LLP (57) ABSTRACT

A spot welding apparatus includes: a fixed frame installed in an arm of a robot; an upper welding gun installed in one side of the fixed frame and reciprocating up and down through a pressurization unit; a rotary unit rotatably installed in a lower side of the fixed frame; and a plurality of lower welding guns installed through the rotary unit to correspond to the upper welding gun.

16 Claims, 12 Drawing Sheets

SPOT WELDING APPARATUS

CROSS-REFERENCE TO RELATED APPLICATION

The present application claims priority of Korean Patent Application Number 10-2013-0116501 filed Sep. 30, 2013, the entire contents of which application is incorporated herein for all purposes by this reference.

BACKGROUND OF INVENTION

1. Field of Invention

The present invention relates to a spot welding apparatus and, more particularly, to a spot welding apparatus which is commonly applicable to multiple classes by selecting a lower welding gun fitting a welding point of a welding target (i.e., a target to be welded) and performing a welding operation, and quickly performs a welding operation within a minimal time in a limited space.

2. Description of Related Art

In general, in manufacturing a vehicle, a vehicle body is completed by bonding various structure components such as a vehicle body panel, and the like, formed through pressing, painting and rustproofing operations are performed on surfaces of the respective components of the competed vehicle body during a painting process, components of a power train system and components of suspension, steering, and braking systems, and the like, are assembled, and an outfitting process of assembling doors, a trunk lid, a hood, and the like, is subsequently performed.

Also, during a vehicle body assembling process of a vehicle, a spot resistance welding through a spot welding apparatus is commonly used to bond two vehicle body panels in bonding vehicle body components such as a roof, a pillar, a side panel, an opening part flange of a vehicle body door, and the like.

Such spot resistance welding, a type of welding performed by applying welding force to a surface of a vehicle body panel, is generally performed by a spot welding apparatus installed in a front end of an arm of a spot welding robot.

A welding gun applied to the spot welding apparatus is classified into an X-type welding gun, a C-type welding gun, and a special type welding gun applied to a special lower arm according to whether a position of a welding part and a vehicle body are interfered.

A single spot welding apparatus selectively employing the X-type welding gun, the C-type welding gun, and the special type welding gun is installed through an arm of a robot.

Thus, a robot including a spot welding apparatus employing the X-type welding gun, a robot including a spot welding apparatus employing the C-type welding gun, and a robot including a spot welding apparatus employing a special type welding gun are installed in lines, respectively, to perform a spot welding operation.

However, in the related art spot welding operation, since a single spot welding apparatus per robot is installed in a robot arm, only single spotting welding is performed at every moment the arm of the robot moves, requiring a great amount of time to perform a prescribed number of welding point operations to degrade productivity and efficiency.

In addition, lower welding guns each having a different shape should be applied according to positions and shapes of welding points, increasing investment cost for facilities, and in particular, in a case in which a plurality of robots having a spot welding apparatus employing a lower welding gun having a special shape are in use, facility and maintenance cost is increased, energy is excessively used, and space occupancy of robots in a mass-production line is increased.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a spot welding apparatus having advantages of being commonly applicable to multiple classes by configuring a plurality of lower welding guns and automatically selecting pertinent lower welding guns appropriate for various welding points of a welding target to perform welding operation, improving productivity, flexibility, and efficiency of a vehicle body process by rapidly performing a welding operation within a minimal time in a limited space, and reducing installation cost by reducing the amount of robots through application of a single apparatus.

Various aspects of the present invention provide for a spot welding apparatus including: a fixed frame installed in an arm of a robot; an upper welding gun installed in one side of the fixed frame and reciprocating up and down through a pressurization unit; a rotary unit rotatably installed in a lower side of the fixed frame; and a plurality of lower welding guns installed through the rotary unit to correspond to the upper welding gun.

The pressurization unit may include: a gear box installed in front of the fixed frame; a pressurization actuator installed in one side of a lower portion of the gear box; and a moving block installed in the other side of the lower portion of the gear box and disposed to reciprocate on a screw shaft rotated upon receiving an operation of the pressurization actuator through the gear box.

The gear box may be installed horizontally in front of the fixed frame.

The pressurization actuator may be installed to be perpendicular with respect to the gear box, and a driving motor may be vertically installed in an adjacent position.

The driving motor may be configured as a step motor whose revolutions per minute (RPM) and rotational direction can be controlled.

The driving motor may be configured as a servo motor whose speed can be controlled such that it is adjusted by itself.

The rotary unit may include: a decelerator installed in a lower side of the fixed frame; a rotary motor installed in an upper portion of the decelerator; and a rotary plate installed below the decelerator, rotated according to an operation of the rotary motor, and having the lower welding guns installed therein.

The rotary motor may be configured as a step motor whose revolutions per minute (RPM) and rotational direction can be controlled.

The rotary motor may be configured as a servo motor whose speed can be controlled such that it is adjusted by itself.

A cross roller ring may be installed between the decelerator and the rotary plate.

The lower welding guns installed in the rotary plate may include first, second, and third lower welding guns with lower arms having different shapes, respectively.

The first, second, and third lower welding guns may be installed to be spaced apart from one another at an angle of 120° in a circumferential direction on the basis of the center of the rotary plate.

The rotary unit may be installed in the fixed frame such that a lower portion thereof is sloped at a predetermined angle so as to be separate from the upper welding gun.

A current applying unit may be installed in the other side of the fixed frame to apply a current to the upper welding gun and the lower welding guns.

The current applying unit may include: a first bus bar installed in one side of a transmitter to apply a current to the upper welding gun; and a second bus bar installed in the other side of the transformer to apply a current to the welding guns through a ground unit.

The ground unit may be installed to be parallel to the rotary unit.

The ground unit may include: a cylinder installed in a rear side of the upper welding gun; and a head connected to the cylinder and moving up and down to be grounded with the lower welding gun.

The cylinder may be configured as a pneumatic cylinder in which a piston is operated by air pressure.

The cylinder may be configured as a hydraulic cylinder in which a piston is operated by oil pressure.

Since a plurality of lower welding guns are rotatably formed and a corresponding lower welding gun is automatically selected therefrom according to various welding points of a welding target to perform a welding operation, the welding operation can be performed within a minimal time in a limited space.

In addition, since the spot welding apparatus is commonly applicable to multiple classes regardless of a vehicle type and a position and a shape of a welding point and rapidly performs a welding operation, productivity, flexibility, and efficiency of a vehicle body process can be enhanced, and since the amount of robots installed in a process line is reduced through an application of the single apparatus, investment cost for facilities can be reduced.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the drawings, sizes and thickness of components are arbitrarily shown for the description purposes, so the present invention is not limited to the illustrations of the drawings and thicknesses are exaggerated to clearly express various parts and regions.

To clarify the present invention, portions irrespective of description are limited and, in the following description, terms such as "first" and "second," etc., may be used only to distinguish one component from another as pertinent components are named the same, and order thereof is not limited.

Figure 1:
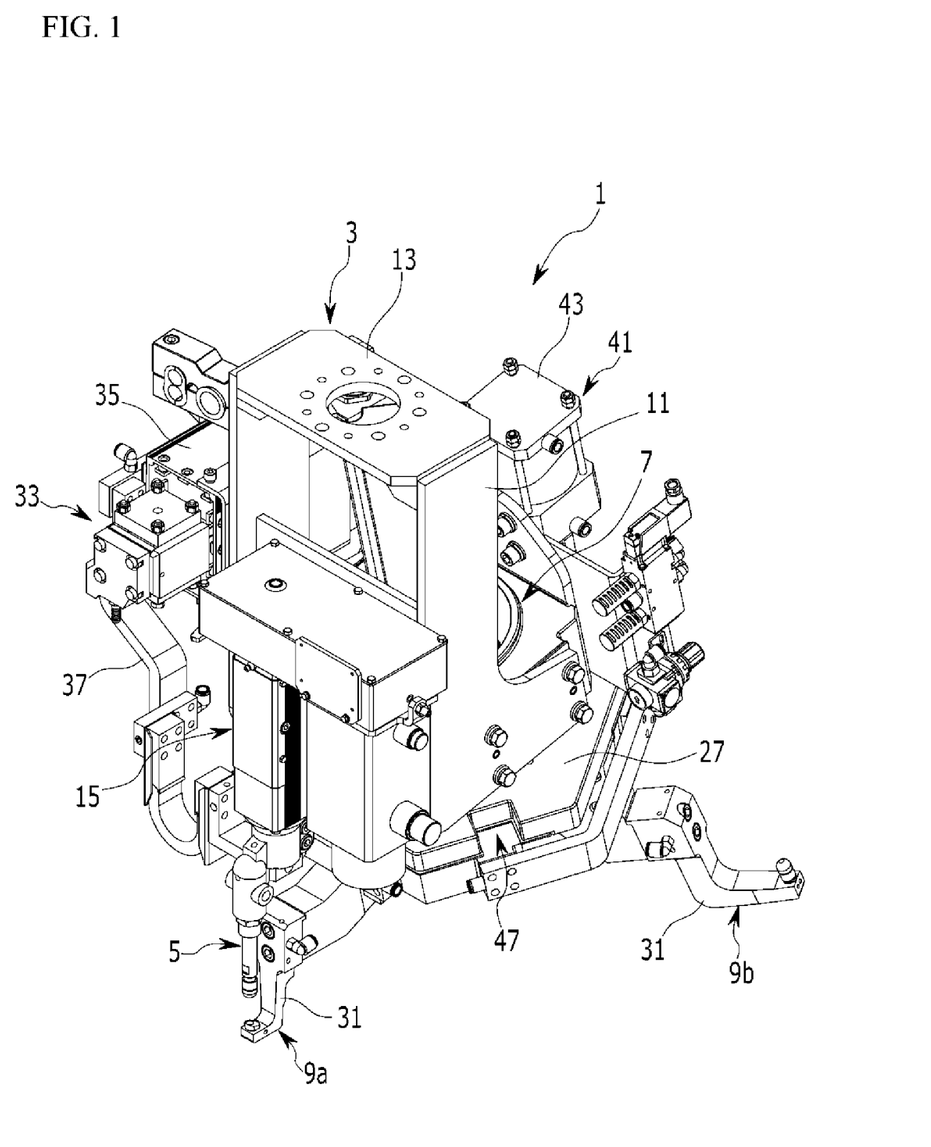
FIG. 1 is a perspective view of an exemplary spot welding apparatus according to the present invention.
Figure 2:
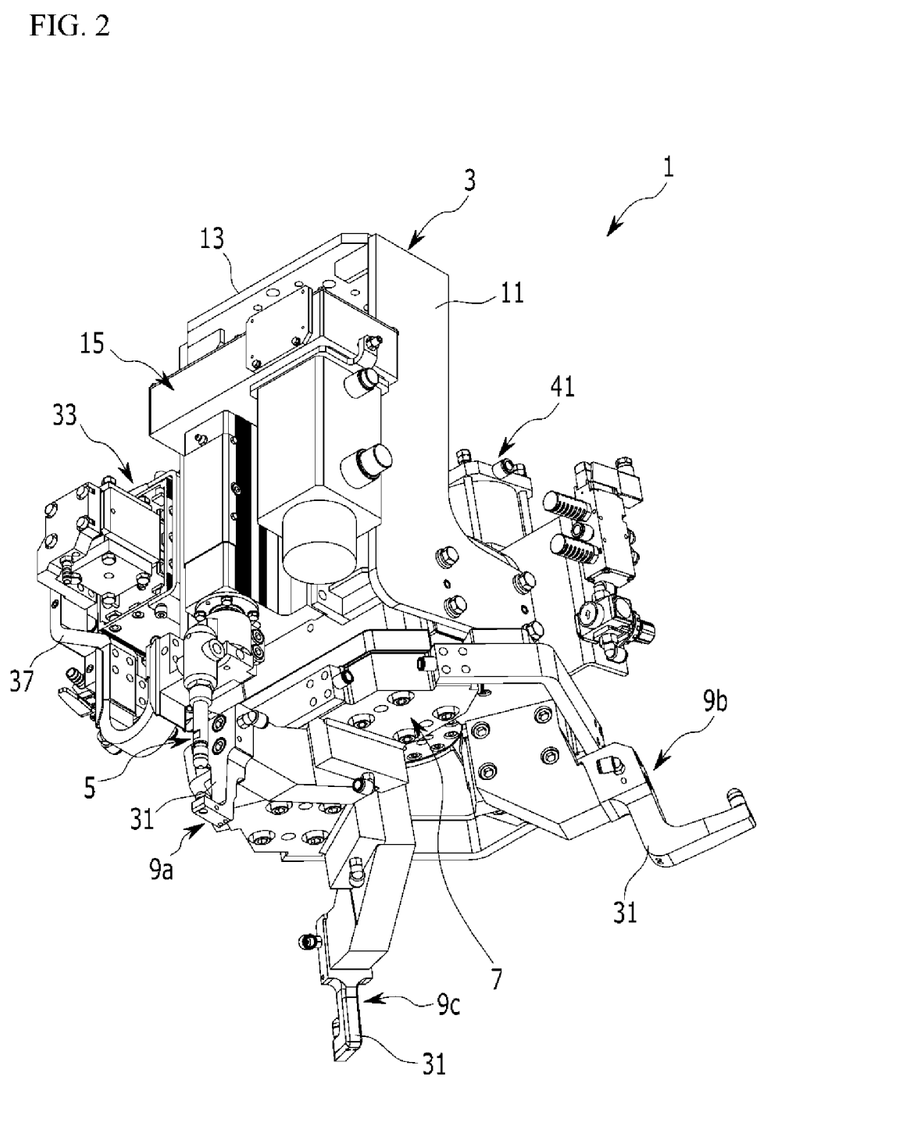
FIG. 2 is a bottom perspective view of the exemplary spot welding apparatus according to the present invention.

With reference to FIGS. 1 and 2, a spot welding apparatus 1 according to various embodiments of the present invention includes a plurality of lower welding guns 9a, 9b, and 9c and perform a welding operation by automatically selecting the lower welding guns 9a, 9b, and 9c according to various welding points of a welding target (i.e., a target to be welded) and pressurizing the same by means of an upper welding gun 5.

Thus, the spot welding apparatus 1 according to various embodiments of the present invention can be commonly applicable to multiple classes, quickly performs a welding operation within a minimal time in a limited space, enhances productivity, flexibility, and efficiency of a vehicle body process, and reduce installation cost by reducing the amount of robots through an application of the single apparatus.

FIG. 1 is a perspective view of a spot welding apparatus according to various embodiments of the present invention, and FIG. 2 is a bottom perspective view of the spot welding apparatus according to various embodiments of the present invention.

Referring to FIGS. 1 and 2, the spot welding apparatus 1 according to various embodiments of the present invention includes a fixed frame 3, an upper welding fun 5, a rotary unit 7, and a plurality of lower welding guns 9a, 9b, and 9c.

The fixed frame 3 includes a fork-type body 11 and a mount portion formed in an upper end of the body 11 and mounted on an arm of a robot.

The upper welding gun 5 is installed in a front side of the fixed frame 3 and move up and down through a pressurization unit 15.

The pressurization unit 15 pressurizes an upper portion of a welding point of a welding target, while moving the upper welding gun 5 up and down.

Figure 3:
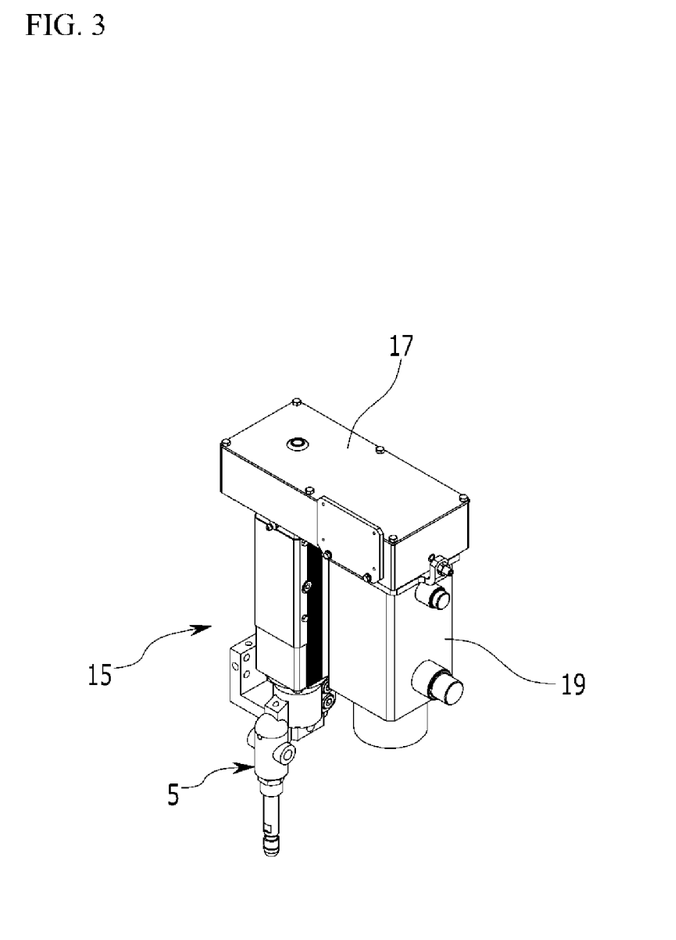
FIG. 3 is a perspective view of a pressurization unit of the exemplary spot welding apparatus according to the present invention.

FIG. 3 is a perspective view of a pressing unit of the spot welding apparatus according to various embodiments of the present invention.

Referring to FIG. 3, the pressurization unit 15 includes a gear box 17, a pressurization actuator 19, and a moving block.

The gear box 17 is horizontally installed in a front upper portion of the fixed frame 3.

The pressurization actuator 19 is vertically installed in one side of a lower portion of the gear box 17, and the moving block is provided in the other side of the lower portion of the gear box 17 such that it can reciprocate on a screw shaft rotating upon receiving an operation of the pressurization actuator 19 through the gear box 17.

In this case, the gear box 17 is rotated upon receiving rotary power by a driving motor vertically installed to be adjacent to the pressurization actuator 19, and the driving motor may be configured as a step motor whose revolutions per minute (RPM) and rotational direction can be controlled or a servo motor whose speed can be controlled such that it is adjusted by itself.

The upper welding gun 5 is installed in the moving block, and the moving block is moved up and down together with the upper welding gun 5 according to an operation of the pressurization actuator 19 in the event of a welding operation.

Meanwhile, the pressurization actuator 19 may be configured as a roller screw actuator that converts torque of an electric motor into a linear movement.

The pressurization actuator 19 rotates the screw shat positioned to be parallel thereto through the gear box 17 to convert a movement of the moving block into a linear movement on the screw shaft to reciprocate the upper welding gun 5 up and down.

The roller screw actuator has a basic configuration in which as the screw shaft connected to the driving shaft of the electric motor is rotated by motor driving force, a nut-type moving block threaded with a screw thread portion of the screw shaft is moved forwardly and backwardly. Thus, since the configuration of the roller screw actuator applicable as the pressurization actuator 19 is known and widely used industrially, a detailed description thereof will be omitted.

The rotary unit 7 is installed in a lower side of the fixed frame 3 and rotated.

Figure 4:
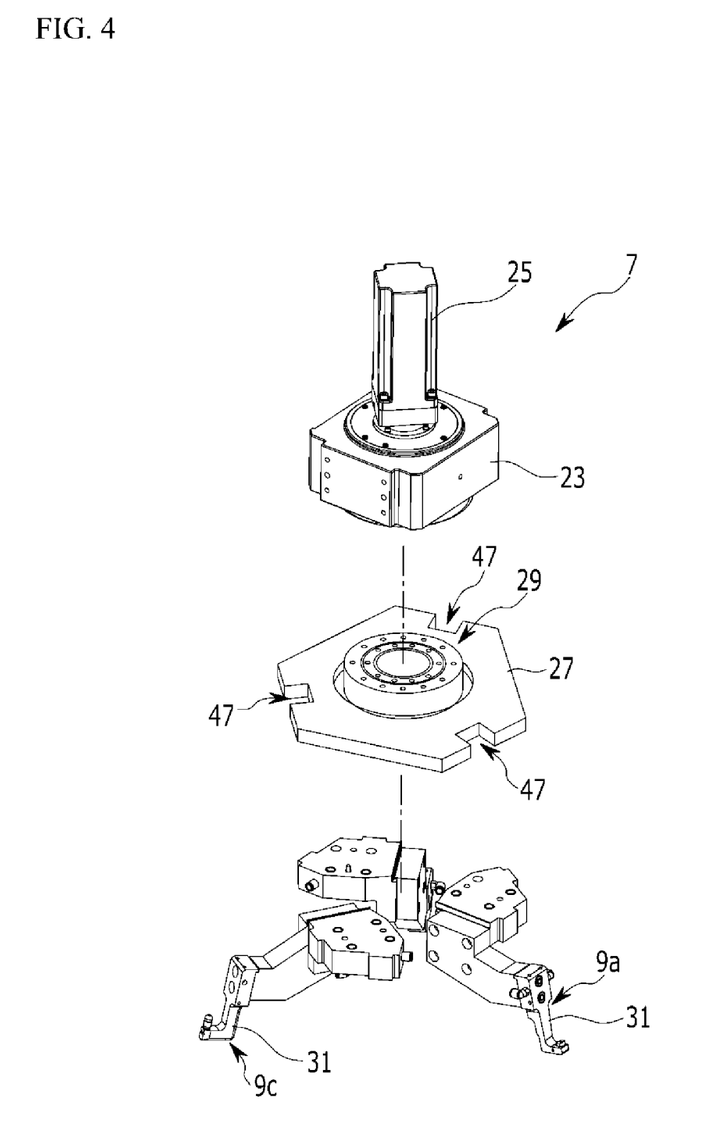
FIG. 4 is an exploded perspective view of a rotary unit of the exemplary spot welding apparatus according to the present invention.

FIG. 4 is an exploded perspective view of the rotary unit of the spot welding apparatus according to various embodiments of the present invention.

Referring to FIG. 4, the rotary unit 7 includes a decelerator 23, a rotary motor 25, and a rotary plate 27.

The decelerator 23 is installed in a lower end portion of the body 11 of the fixed frame 3, and the rotary motor 25 is vertically installed in an upper portion of the decelerator 23 and installed within the body 11

The rotary plate 27 is installed below the decelerator 23 and rotated according to an operation of the rotary motor 25, and a plurality of the lower welding guns 9a, 9b, and 9c are installed beneath the rotary plate 27.

Here, the rotary motor 25 may be configured as a step motor whose RPM and rotational direction can be controlled or a servo motor whose speed can be controlled such that it is adjusted by itself.

A general cross roller ring 29 including an outer ring and an inner ring may be installed between the decelerator 23 and the rotary plate 27, and here, since the decelerator 23 and the cross roller ring 29 are known components widely used in the art, a detailed description thereof will be omitted.

The rotary unit 7 may be installed in the fixed frame 3 such that a rotation center axis of the decelerator 23, the rotary servo motor 25, and the rotary plat 27 is sloped at a predetermined angle so as to be separate in a lower portion thereof from the upper welding gun 5.

Installed on a lower surface of the rotary plate 27 of the rotary unit 7, and any one of the plurality of installed lower welding guns 9a, 9b, and 9c corresponds to the upper welding gun 5.

In this case, the lower welding guns 9a, 9b, and 9c are configured as a first lower welding gun 9a, a second lower welding gun 9b, and a third welding gun 9c with lower arms 31 having different shapes, respectively, and installed to be spaced apart from one another at an angle of 120° in a circumferential direction on the basis of the center of the rotary plate 27.

The lower welding guns 9a, 9b, and 9c may be made of duralumin, an aluminum alloy which is storing and light.

In this case, as the rotary plate 27 is rotated according to an operation of the rotary servo motor 25 of the rotary unit 7, the first, second, and third lower welding guns 9a, 9b, and 9c with lower arms 31 having different shapes act to correspond to the upper welding gun 5, performing a welding operation with respect to various welding points of a welding target.

At this time, since the rotary unit including the first, second, and third lower welding guns 9a, 9b, and 9c installed therein is installed to be sloped at a predetermined angle, the second and third lower welding guns 9b and 9c, excluding the first lower welding gun 9a that corresponds to the upper welding gun 5, are not positioned to be coplanar with the first lower welding gun 9a.

Thus, when the first lower welding gun 9a performs a welding operation, since the second and third lower welding guns 9b and 9c are prevented from being positioned to be coplanar with the first lower welding gun 9a, interference of the second and third lower welding guns 9b and 9c can be restrained.

In the above description, the first lower welding gun 9a corresponds to the upper welding gun 5 for the description purpose on the basis of the drawing, but the present inventive concept is not limited thereto and the second or third lower welding gun 9b or 9c may also correspond to the upper welding gun 5.

Meanwhile, a current applying unit 33 may be installed in one side of the body 11 of the fixed frame 3 to apply a current to the upper welding gun 5 and the lower welding guns 9a, 9b, and 9c.

Figure 5:
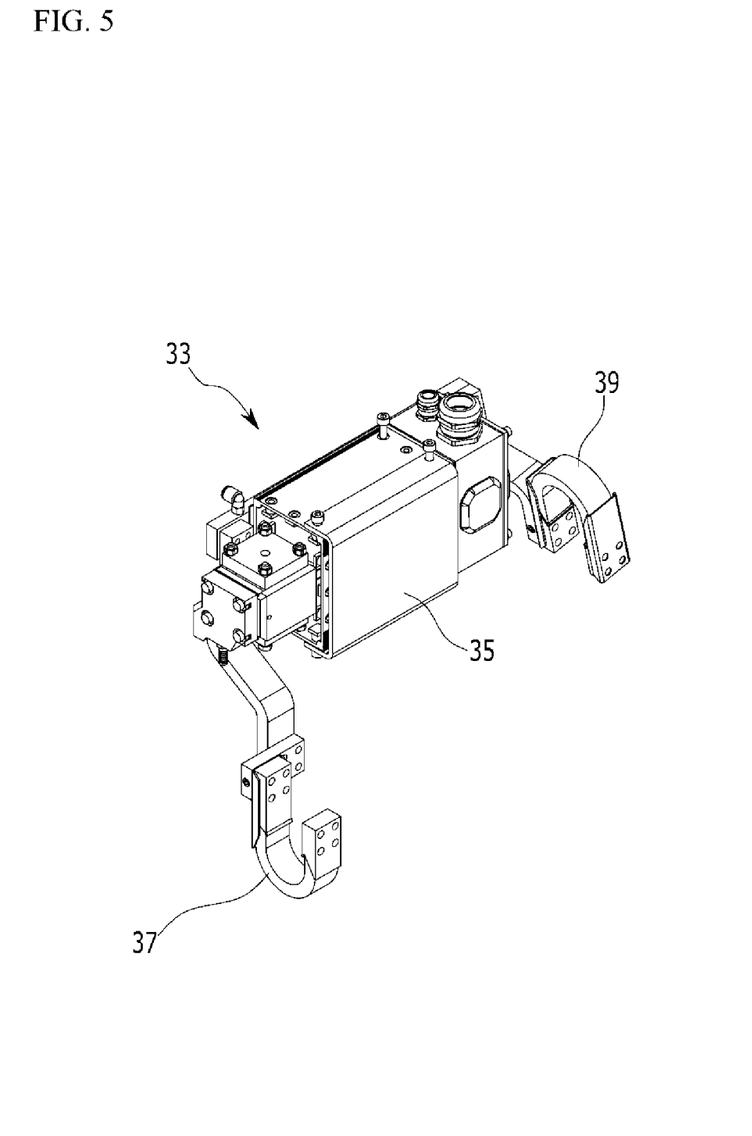
FIG. 5 is a perspective view of a current applying unit of the exemplary spot welding apparatus according to the present invention.

FIG. 5 is a perspective view of a current applying unit of the spot welding apparatus according to various embodiments of the present invention.

Referring to FIG. 5, the current applying unit 33 includes a transformer 35, a first bus bar 37, and a second bus bar 39.

The transformer 35 is installed in one side of the body 11 of the fixed frame 3, and the first bus bar 37 is installed in one side of the transformer 35 to apply a current to the upper welding gun 5.

The second bus bar 39 is installed in the other side of the transformer 35 to apply a current to the lower welding guns 9a, 9b, and 9c through the ground unit 41.

The current applying unit 33 including the transformer 35 and the first and second bus bars 37 and 39 and installed in the spot welding apparatus 1 has known functions widely used in the art, so a detailed description thereof will be omitted.

Figure 6:
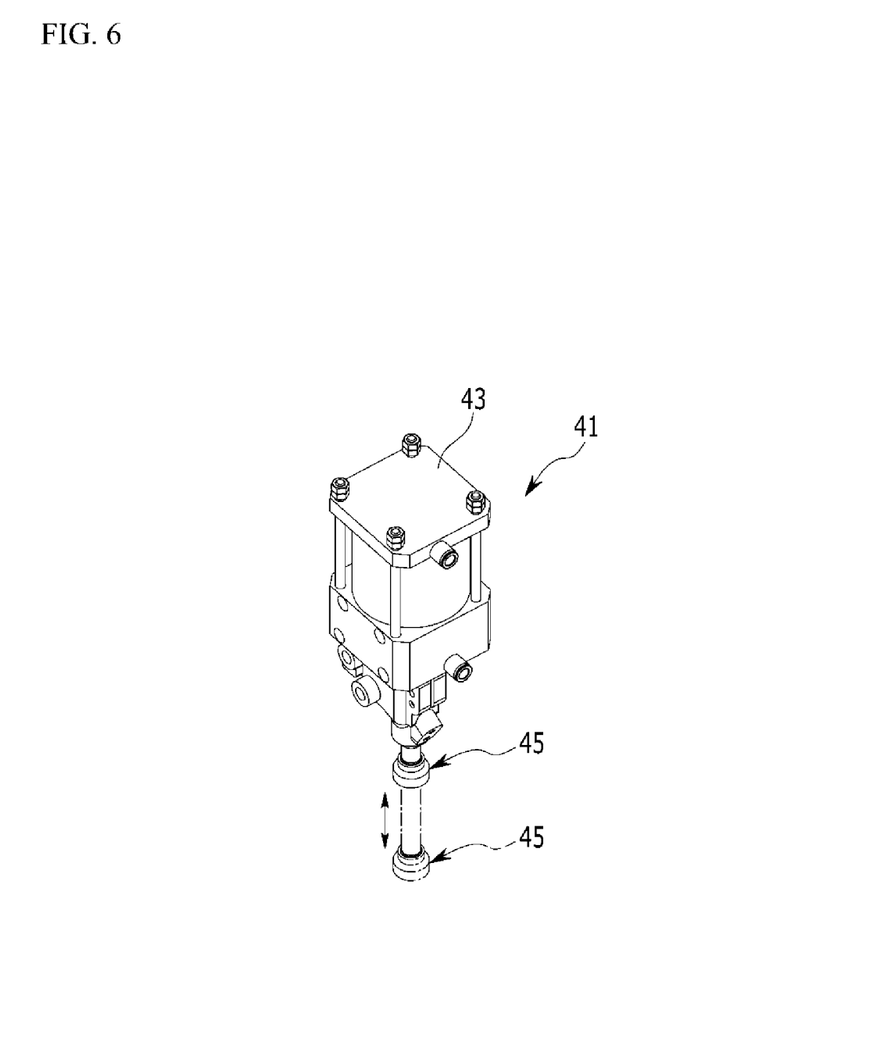
FIG. 6 is a perspective view of a ground unit of the exemplary spot welding apparatus according the present invention.

FIG. 6 is a perspective view of the ground unit of the spot welding apparatus according to various embodiments of the present invention.

Referring to FIG. 6, a ground unit 41 includes a cylinder 43 and a head 45.

The cylinder 43 is connected to the second bus bar 39 and installed in an upper side of the rotary plate 27 in a rear side of the fixed frame 3. Here, the cylinder 43 may be configured as a pneumatic cylinder in which a piston is operated by air pressure or a hydraulic cylinder in which a piston is operated by oil pressure.

The head 45 is connected to a rod of the cylinder 43 and grounded with the lower welding guns 9a, 9b, and 9c through the through recesses 47 (please see FIG. 4) formed in the rotary plate 27 to correspond to the lower welding guns 9a, 9b, and 9c, while reciprocating up and down according to an operation of the cylinder 43.

Namely, when the rotary plate 27 is rotated, the head 45 of the ground unit 41 is moved upwardly according to an operation of the cylinder 43, and when a welding operation is performed, the head 45 descends to be grounded with the lower welding guns 9a, 9b, and 9c so as to be electrically connected with the current applying unit 33.

That is, the lower welding guns 9a, 9b, and 9c are electrically connected with the ground unit 41 on the rotary plate 27 by the medium of the rotary plate 27.

Meanwhile, the ground unit 41 may be installed to be parallel to the rotary unit 7.

Hereinafter, an operation of the spot welding apparatus 1 having the foregoing configuration will be described with reference to FIGS. 7 and 8.

FIGS. 7 through 12 are views illustrating operational states of the spot welding apparatus according to various embodiments of the present invention.

First, when the first lower welding gun 9a in a home position performs a welding operation, the spot welding apparatus 1 is moved to a welding point of a welding target according to an operation of a robot.

Figure 7:
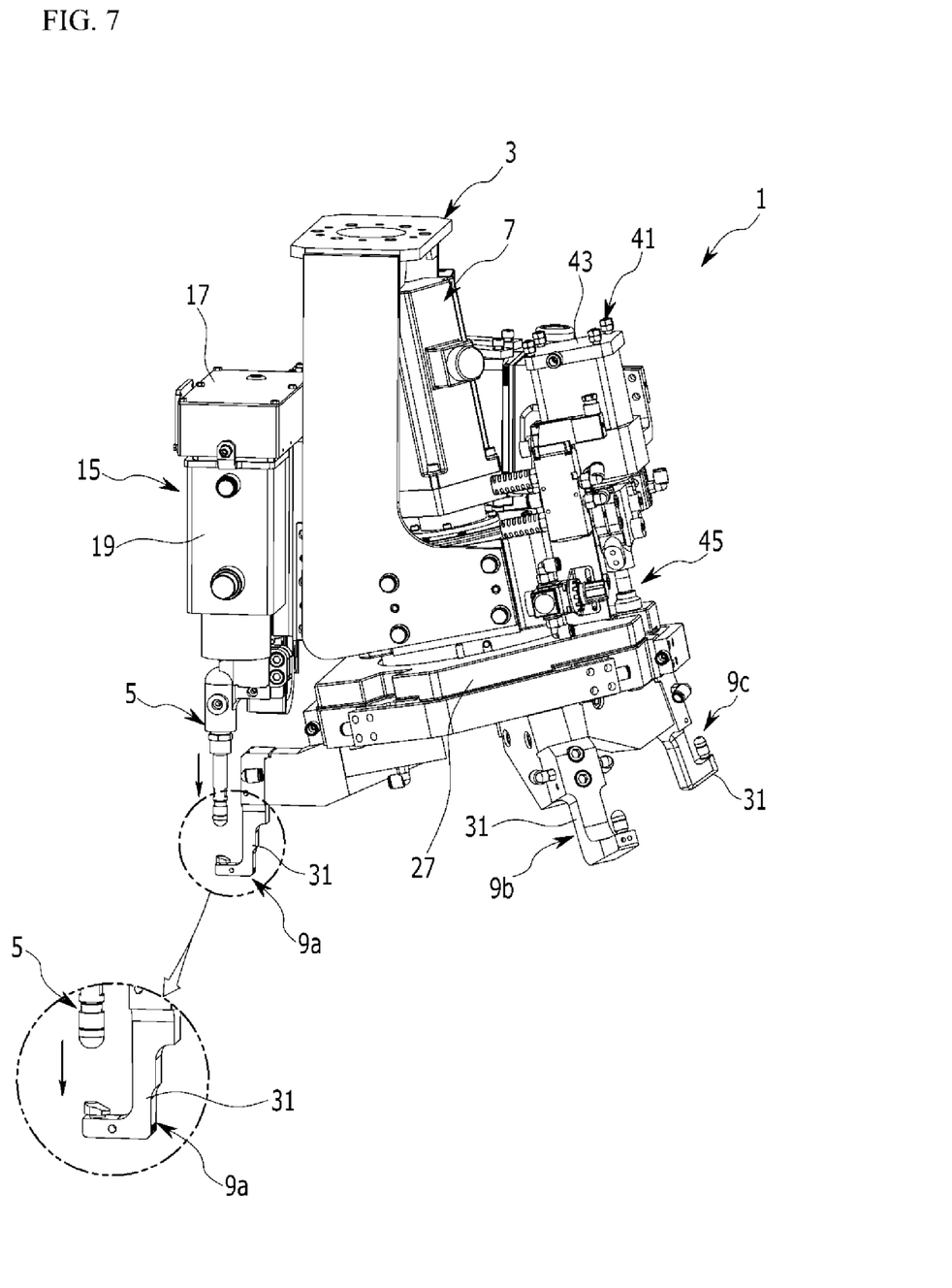
FIGS. 7 through 12 are views illustrating operational states of the exemplary spot welding apparatus according to the present invention.
Figure 8:
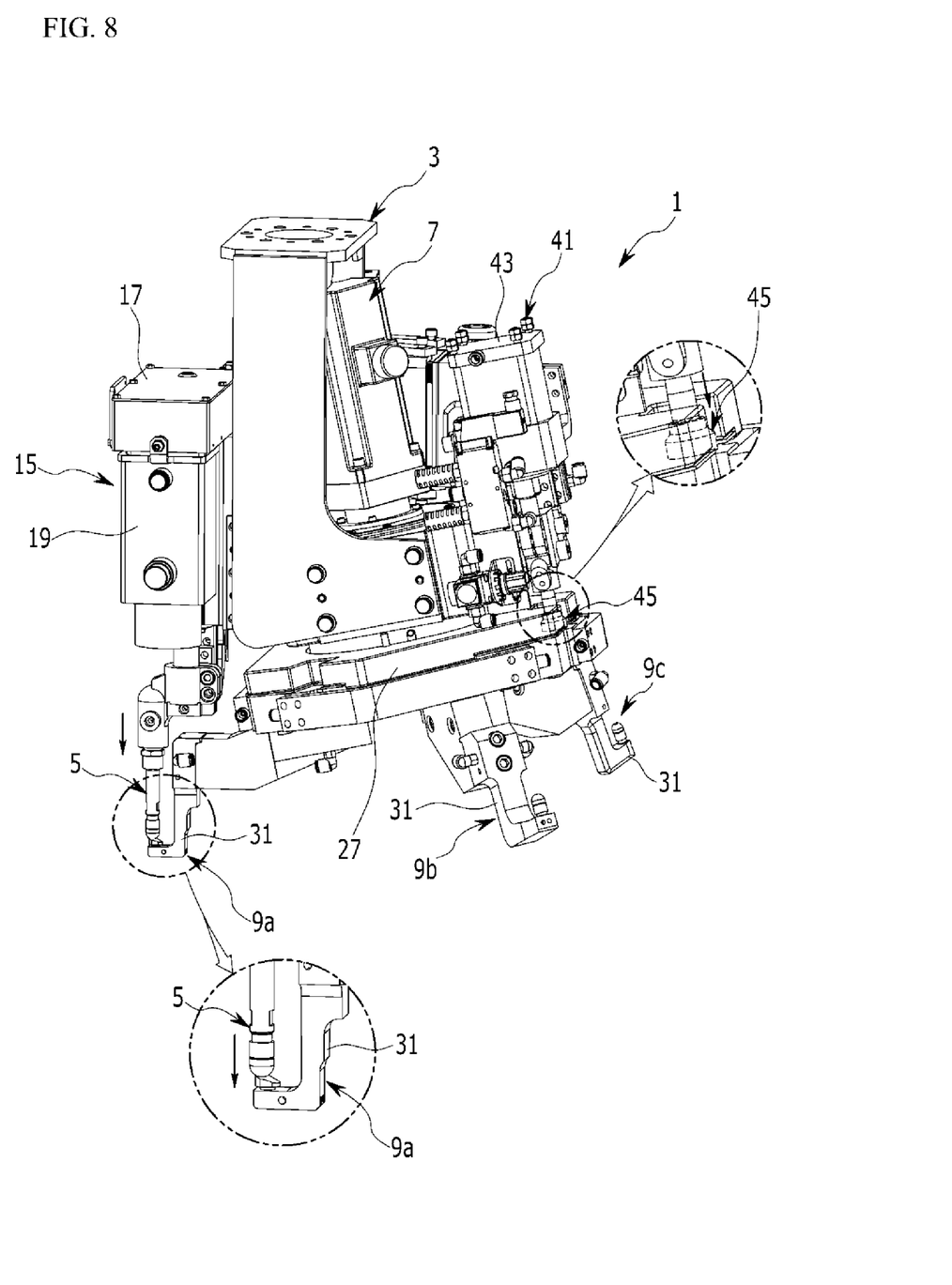

Referring to FIG. 7, thereafter, the ground unit 41 is grounded to the third lower welding gun 9c according to an operation of the cylinder 43, and in a state in which a lower portion of the welding point is supported by the first lower welding gun 9a, the pressurization actuator 19 of the pressurization unit 15 is operated to lower the upper welding gun 5 to pressurize the welding point together with the first lower welding gun 9a to perform a welding operation as illustrated in FIG. 8.

Figure 9:
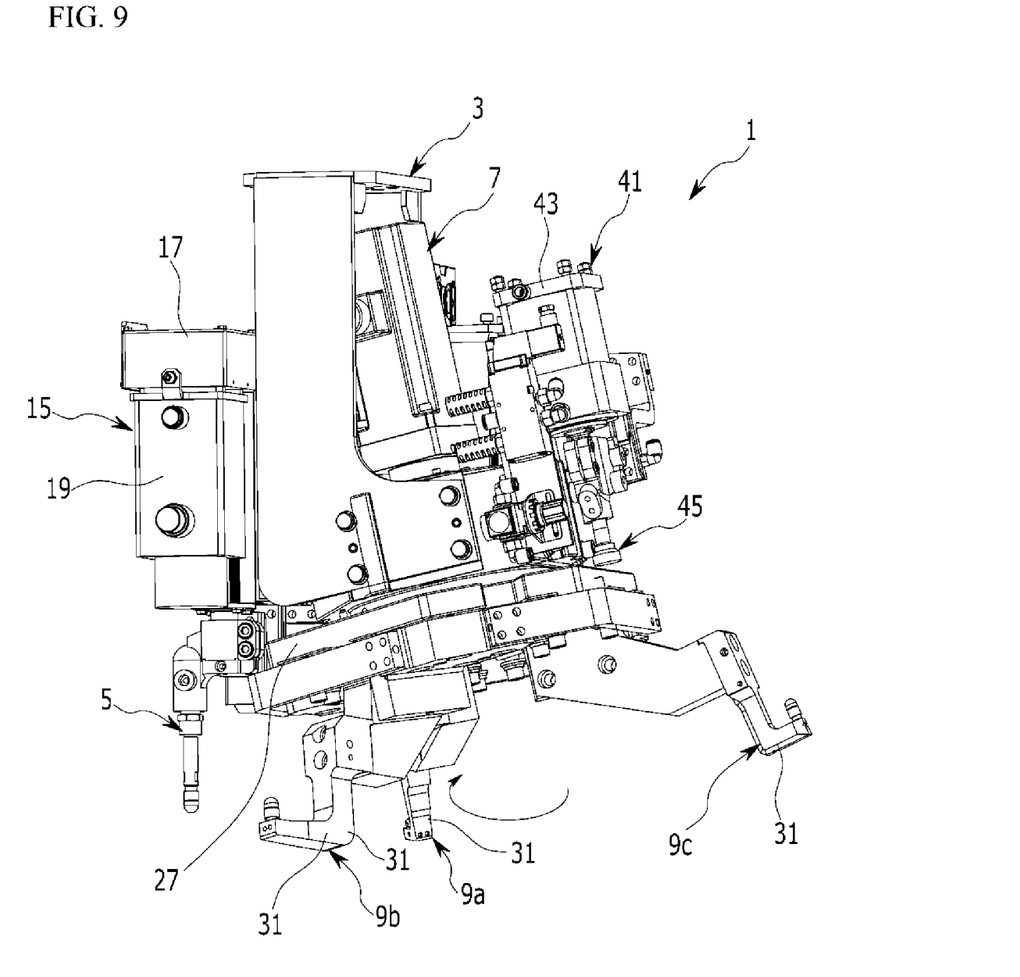

When a shape and a position of a welding point of the welding target are changed and the second lower welding gun 9b is required, the head 45 of the ground unit 41 is lifted according to an operation of the cylinder 43, releasing the ground state.

Thereafter, the rotary plate 27 is rotated by the rotary unit 7 to allow the second lower welding gun 9b to correspond to the upper welding gun 5.

Figure 10:
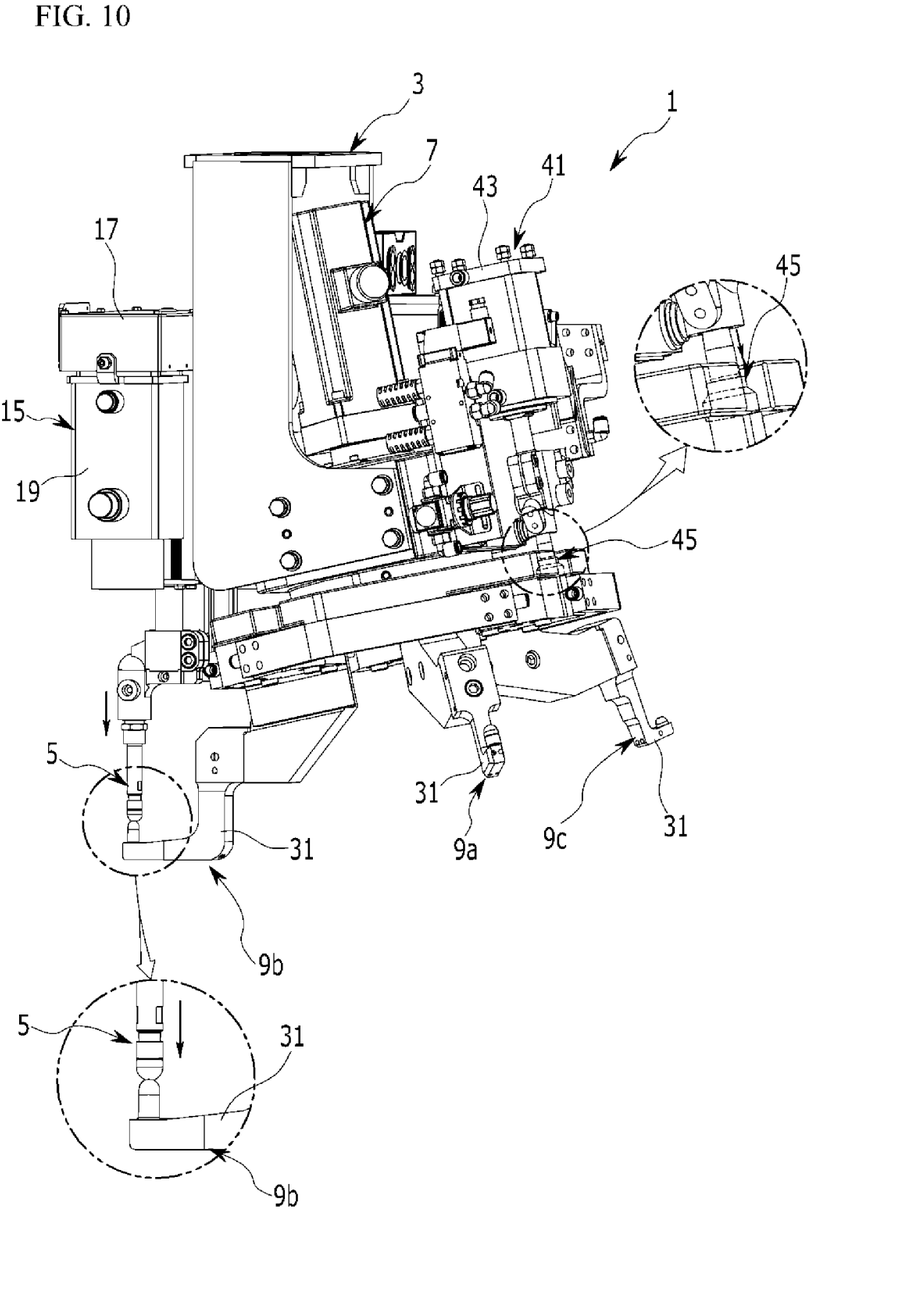
Figure 11:
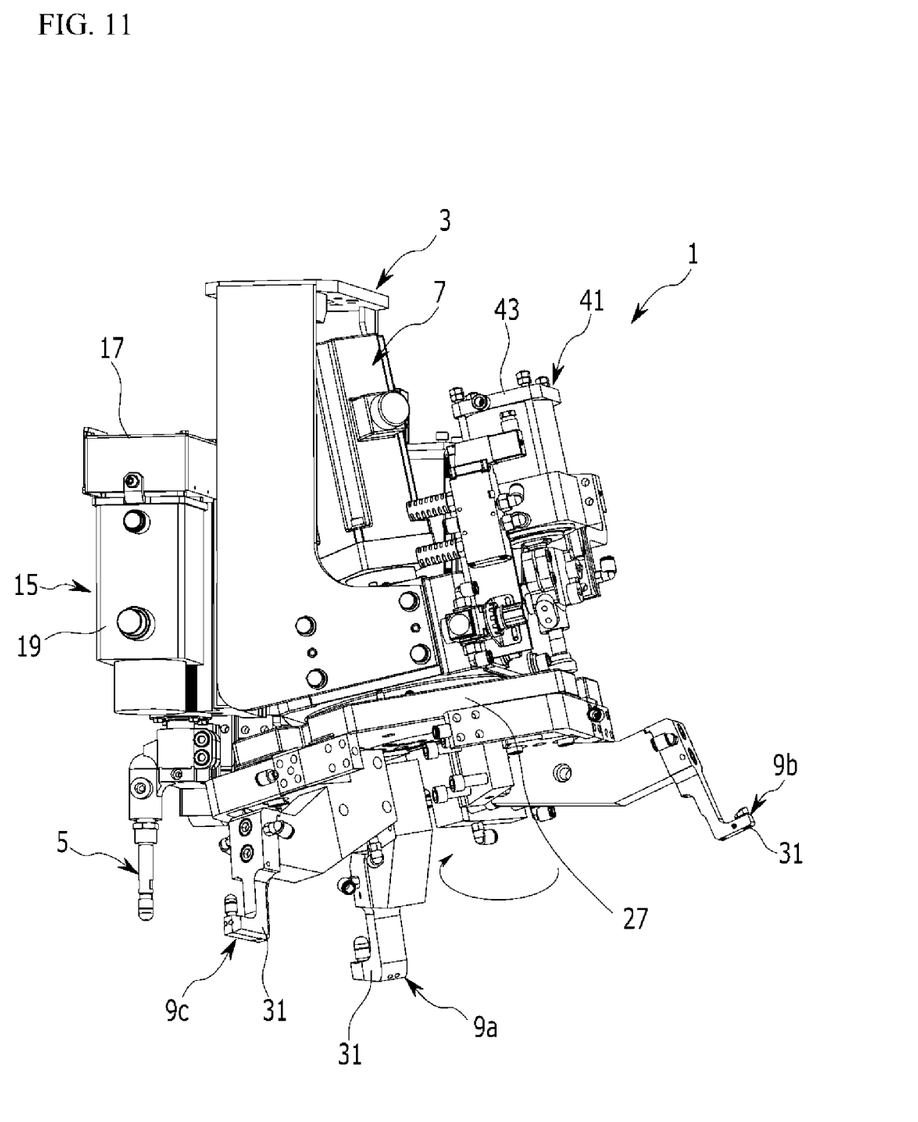
Figure 12:
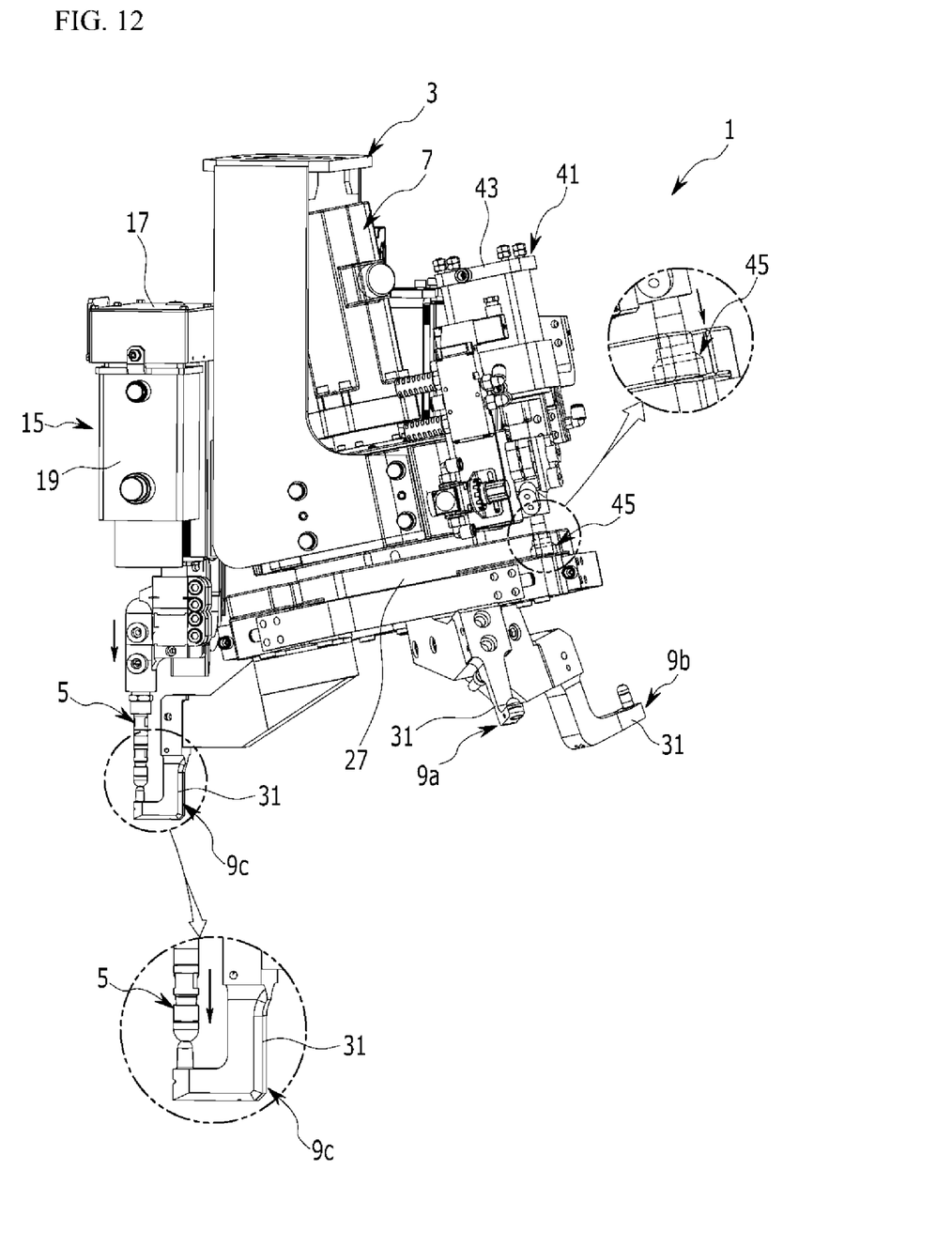

In this state, when the second lower welding gun 9b is in a home position, the head 45 of the ground unit 41 descends to be grounded with the first lower welding gun 9a as illustrated in FIG. 10, and as described above, the upper welding gun 5 is operated to perform a welding operation on the corresponding welding point.

Also, when a shape and a position of a welding point of the welding target are changed and the third lower welding gun 9c is required, a welding operation is performed on the corresponding welding point through the sequential processes as described above with reference to FIGS. 11 and 12.

Meanwhile, in the above description, the first, second, and third lower welding guns 9a, 9b, and 9c perform the operations sequentially, but the present inventive concept is not limited thereto and, immediately after a welding operation is performed by using the first lower welding gun 9a, a welding operation may be performed by using the third lower welding gun 9c.

In this manner, the spot welding apparatus 1 according to various embodiments of the present invention performs a welding operation by using an appropriate one of the first, second, and third lower welding guns 9a, 9b, and 9c according to a position and a shape of a welding point, thereby flexibly coping with shapes and positions of various welding points.

Also, since a pertinent one of the lower welding guns 9a, 9b, and 9c is automatically selected to perform a welding operation according to various welding points of a welding target, the welding operation can be quickly performed with a minimal time within a limited space.

In addition, since the spot welding apparatus 1 is commonly applicable to multiple classes regardless of a vehicle type and a position and a shape of a welding point and rapidly perform a welding operation, productivity, flexibility, and efficiency of a vehicle body process can be enhanced, and since the amount of robots installed in a process line is reduced through an application of the single apparatus, investment cost for facilities can be reduced.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A spot welding apparatus comprising:
  a fixed frame installed on an arm of a robot;
  an upper welding gun installed in a first side of the fixed frame and vertically reciprocating up and down by a pressurization unit along the first side of the fixed member;
  a rotary unit rotatably installed in a lower side of the fixed frame; and
  a plurality of lower welding guns installed through the rotary unit to correspond to the upper welding gun,
  wherein the rotary unit comprises:
    a decelerator installed in a lower side of the fixed frame;
    a rotary motor installed in an upper portion of the decelerator; and
    a rotary plate installed below and engaged with the decelerator, rotated by the rotary motor, and having the lower welding guns installed therein,
  wherein the rotary motor is configured as a step motor whose revolutions per minute (RPM) and rotational direction are controlled, and
  wherein a cross roller ring is installed between the decelerator and the rotary plate.

2. The spot welding apparatus of claim 1, wherein the pressurization unit comprises:
  a gear box installed in front of the fixed frame;
  a pressurization actuator installed in a first side of a lower portion of the gear box; and
  a moving block installed in a second side of the lower portion of the gear box reciprocating on a screw shaft rotated upon receiving an operation of the pressurization actuator through the gear box.

3. The spot welding apparatus of claim 1, wherein the rotary motor is configured as a servo motor whose speed is automatically self-controlled.

4. The spot welding apparatus of claim 1, wherein the lower welding guns installed in the rotary plate comprise first, second, and third lower welding guns with lower arms having different shapes, respectively.

5. The spot welding apparatus of claim 1, wherein the rotary unit is installed in the fixed frame such that a lower portion thereof is sloped at a predetermined angle separate from the upper welding gun.

6. The spot welding apparatus of claim 1, wherein a current applying unit is installed in a second side of the fixed frame to apply a current to the upper welding gun and the lower welding guns.

7. The spot welding apparatus of claim 2, wherein the gear box is installed horizontally in front of the fixed frame.

8. The spot welding apparatus of claim 2, wherein the pressurization actuator is installed perpendicular with respect to the gear box, and a driving motor is vertically installed in an adjacent position.

9. The spot welding apparatus of claim 4, wherein the first, second, and third lower welding guns are spaced apart from one another at an angle of 120° in a circumferential direction on the basis of the center of the rotary plate.

10. The spot welding apparatus of claim 6, wherein the current applying unit comprises:

a first bus bar installed in a first side of a transmitter to apply a current to the upper welding gun; and a second bus bar installed in a second side of the transformer to apply a current to the welding guns through a ground unit.

11. The spot welding apparatus of claim 8, wherein the driving motor is configured as a step motor whose revolutions per minute (RPM) and rotational direction are controlled.

12. The spot welding apparatus of claim 8, wherein the driving motor is configured as a servo motor whose speed is automatically self-controlled.

13. The spot welding apparatus of claim 10, wherein the ground unit is installed parallel to the rotary unit.

14. The spot welding apparatus of claim 10, wherein the ground unit comprises:

a cylinder installed in a rear side of the upper welding gun; and a head connected to the cylinder and moving up and down to be grounded with the lower welding gun.

15. The spot welding apparatus of claim 14, wherein the cylinder is configured as a pneumatic cylinder in which a piston is operated by air pressure.

16. The spot welding apparatus of claim 14, wherein the cylinder is configured as a hydraulic cylinder in which a piston is operated by oil pressure.

\* \* \* \* \*